(12) United States Patent
Sim

(10) Patent No.: US 6,740,271 B2
(45) Date of Patent: May 25, 2004

(54) BOARD AND BOARD COMPOSITION AND MANUFACTURING METHOD THEREOF USING CRUSHED VEGETATIONAL MATERIAL AND CLAY

(76) Inventor: Man-Gu Sim, 222-4, Gyerim 2-dong, Dong-gu, Kwangju-city (KR)

( * ) Notice: Subject to any disclaimer, the term of this patent is extended or adjusted under 35 U.S.C. 154(b) by 102 days.

(21) Appl. No.: 10/127,612

(22) Filed: Apr. 23, 2002

(65) Prior Publication Data

US 2003/0006000 A1 Jan. 9, 2003

(30) Foreign Application Priority Data

Jul. 4, 2001 (KR) .................................... 2001-0039881

(51) Int. Cl.⁷ .................................................. B27N 3/08
(52) U.S. Cl. .......................... 264/113; 264/112; 524/13
(58) Field of Search ................................ 264/112, 113; 524/13, 14, 15

(56) References Cited

U.S. PATENT DOCUMENTS 5,554,330 A * 9/1996 Flannery et al. ............ 264/113
5,855,832 A * 1/1999 Clausi ......................... 264/109
5,932,038 A * 8/1999 Bach et al. ................. 156/62.2

* cited by examiner

*Primary Examiner*—Mary Lynn Theisen
(74) *Attorney, Agent, or Firm*—Burns, Doane, Swecker & Mathis, L.L.P.

(57) ABSTRACT

There is disclosed a board and a board composition using clay and crushed vegetational materials, which is environment friendly and recirculative and can be also used as a natural basic material for articles of furniture or architectural interior/exterior materials, thereby being used as compost when being scrapped, and a manufacturing method thereof. The board is fabricated by forming a composition fabricated by mixing vegetational material, clay, a seaweed adhesive and a functional adhesive, and an auxiliary material at a ratio of 40~65:40~10:10~20:10~5 weight percent, and then throwing the composition into a hopper; withdrawing the composition received in the hopper so as to be passed between a pair of rollers and then molding the composition in a desired size; passing the composition between the rollers heated at a temperature of 100~300° C. and disposing paper or woven fabrics at upper and lower surface of the composition and then pressing the composition along with the paper or woven fabrics; and cutting the pressed composition in a desired size.

8 Claims, 2 Drawing Sheets

[FIG.1]
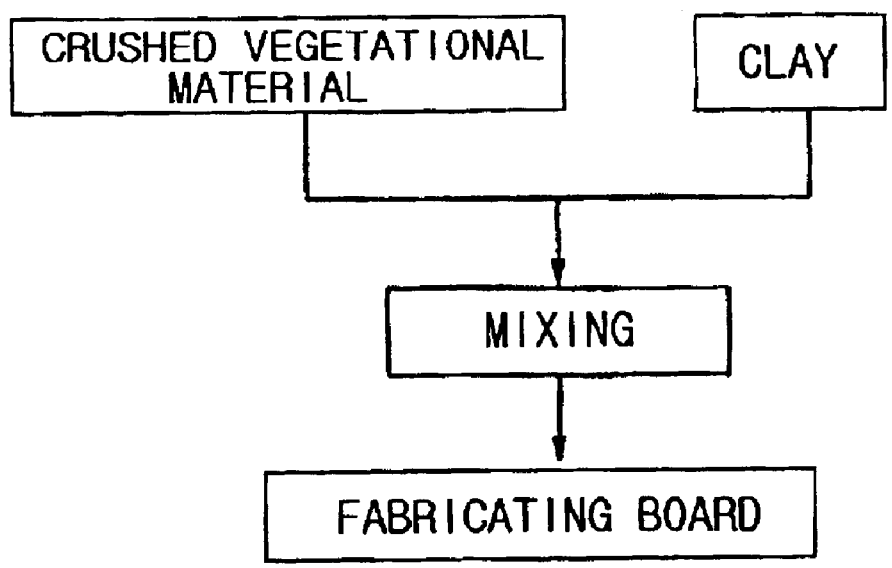

[FIG,2]
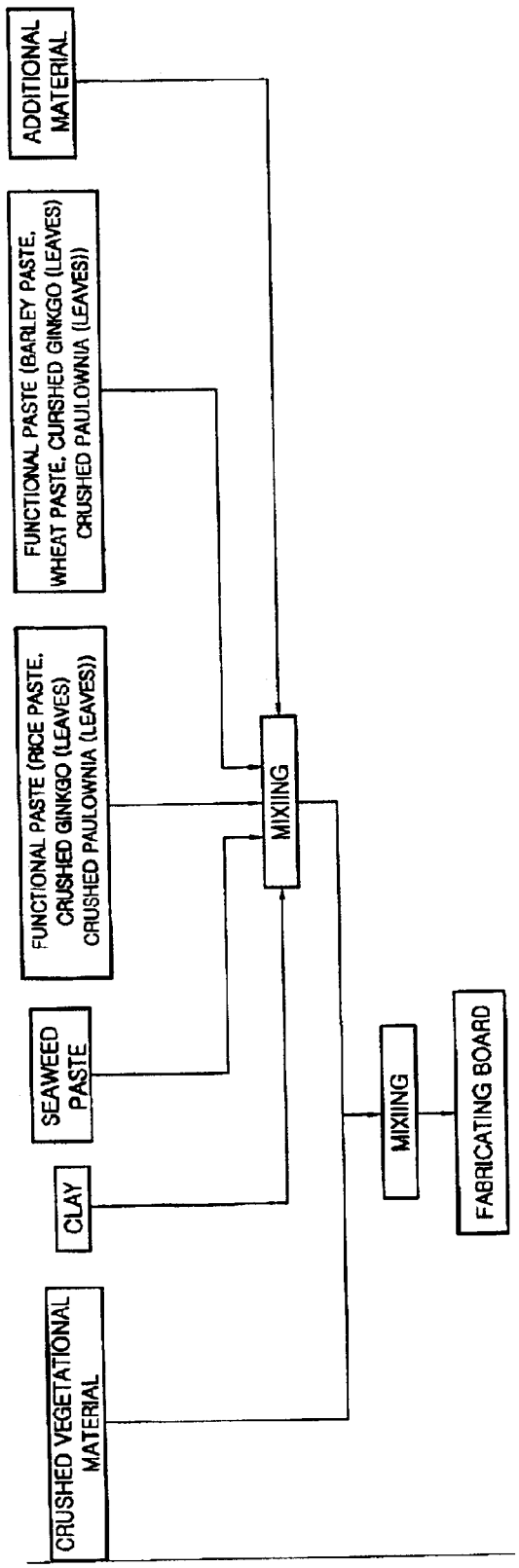

BOARD AND BOARD COMPOSITION AND MANUFACTURING METHOD THEREOF USING CRUSHED VEGETATIONAL MATERIAL AND CLAY

Priority is claimed to Patent Application No. 39881/2001 filed in Rep. of Korea on Jul. 4, 2001, herein incorporated by reference.

BACKGROUND OF THE INVENTION

1. Field of the Invention

The present invention relates to a board and a board composition and a manufacturing method thereof using clay and crushed vegetational materials made of grasses, trees, leaves, rice straw, barley straw and wheat straw, etc., and more particularly, to a board and a board composition using clay and crushed vegetational materials, which is environment friendly and recirculative and can be also used as a natural basic material for articles of furniture or architectural interior/exterior materials, thereby being used as good quality of compost when being scrapped, and a manufacturing method thereof.

2. Description of the Related Art

As various conventional boards, there had been used various boards such as a board in which wood powder and chips are mixed with a chemical adhesive and then compressed, a gypsum board in which a paper board is attached to both sides of a gypsum plate having a desired thickness, a gypsum tex, and a board fabricated by molding synthetic resin materials, etc.

In the case of the gypsum board, firstly, calcined gypsum obtained by treating natural phosphogypsum at a desired temperature is mixed with an adhesive composition, a surfactant, a foaming agent, other addition agents and water to obtain sludge. The sludge is injected between two paper boards and then dried to form the gypsum board having thermal insulation and fire proof functions. However, since chemicals are used during its fabricating process, it is noxious to a human body. Particularly, glass fiber, rock wool, etc., partially contained in the gypsum tex are noxious to the human body and also contaminates nature when being scrapped.

Further, in the case of the board formed of the wood chips and the synthetic resin board, since they have a good strength and workability, they are used in various applications such as an interior material and a material for furniture, etc. however, they have poor fireproof, mothproof, dampproof and thermal insulation functions. Particularly, in case they are scrapped, the composition and chemical adhesive component, etc., contained therein causes the contamination of the soil and water when being resolved. Further, since the materials are combustible, there is another problem that many casualties and lots of damage in property are generated when a fire is occurred. Moreover, since noxious components are usually discharged from the board to nature, there is yet another problem that indoor air is contaminated.

SUMMARY OF THE INVENTION

Therefore, it is an object of the present invention to provide a board, a board composition and a fabricating method thereof using natural materials such as clay, crushed vegetational materials made of rice straw, barley straw, wheat straw, grasses, trees, leaves, etc., and a functional adhesive and an adhesive made from seaweeds, which can solve the conventional problems and also can be resolved in nature without the contamination of nature.

To achieve one of the aforementioned objects of the present invention, there is provided a method of fabricating a board using vegetational material and clay, comprising steps of: forming a composition fabricated by mixing vegetational material, clay, a seaweed adhesive and a functional adhesive, and an auxiliary material at a ratio of 40~65:40~10:10~20:10~5 weight percent, and then throwing the composition into a hopper; withdrawing the composition received in the hopper so as to be passed between a pair of rollers and then molding the composition in a desired size; passing the composition between the rollers heated at a temperature of 100~300° C. and disposing paper or woven fabrics at upper and lower surface of the composition and then pressing the composition along with the paper or woven fabrics; and cutting the pressed composition in a desired size.

That is, the crushed vegetational material comprised of thin films and chips is mixed with the clay of 100~200 mesh (it is not limited to the size) at a ratio of 50~80:50~20 weight percent, wherein the clay is mixed with water at a ratio of 50~50 weight percent, and the mixed composition is homogenized to form a flexible composition. Alternatively, the crushed vegetational material comprised of thin films and chips is mixed with the clay of 100~200 mesh at a ratio of 40~65:40~10 weight percent, wherein the clay is mixed with water at a ratio of 60~40 weight percent, and the mixed composition mixed with an adhesive of 10~20 weight percent and an additional material of 10~5 weight percent and then homogenized to form a hard composition, wherein the adhesive is fabricated by boiling seaweed and water mixed at a ratio of 40:60 weight percent. The flexible or hard composition is thrown into a hopper, and withdrawn so as to pass between a pair of rollers along with paper or woven fabrics disposed at both upper and lower surfaces thereof. Then, the composition is press-molded by passing between the rollers heated at a temperature of 100~300° C. and cut in a desired size.

BRIEF DESCRIPTION OF THE DRAWINGS

The above objects and other advantages of the present invention will become more apparent by describing in detail preferred embodiments thereof with reference to the attached drawings in which:

FIG. 1 is a flow chart showing a process of fabricating a board according to the present invention; and FIG. 2 is a flow chart showing other fabricating process according to the present invention.

DETAILED DESCRIPTION OF THE PREFERRED EMBODIMENTS

Now, preferred embodiments of the present invention will be described in detail with reference to the annexed drawings.

First Embodiment

A First Process

A Process of Forming Crushed Vegetational Materials

Dried rice straw, barley straw, wheat straw, ginkgo tree (leaves thereof), paulownia tree (leaves thereof), etc., are crushed into particles of 50~200 mesh (it is not limited to this size), powder, or various-shaped pellicles or chips to form the crushed vegetational materials.

A Second Process
A Process of Forming Clay

Clay (loess, diatomite, elvan, etc.) of 100~200 (it is not limited to this size) mesh is mixed with water in a ratio of 60:40 weight percent and kneaded. Then, the kneaded dough is ripened for 5~20 days to form the seaweed adhesive.

A Third Process
A Process of Forming a Seaweed Adhesive

Seaweeds (brown seaweed, sea tangle, sea lettuce, etc.) are mixed with water in a ratio of 40:60 weight percent. Then, after the mixture is boiled for 4~8 hours in a cauldron, the dregs are removed and the mixture is maintained at a temperature of 60~80° C. to form the seaweed adhesive.

A fourth Process
A Process of Forming a Functional Adhesive

A board fabricated by mainly mixing the rice straw having a warmth emitting function is used as a construction material, a material for furniture and a board which require the thermal isolation function. In this case, an adhesive used therein comprises rice paste having the warmth emitting function, crushed ginkgo tree (leaves thereof) of 50~200 mesh, crushed paulownia tree (leaves thereof) of 50~200 mesh (it is not limited to this size) at a ratio of 60~80:20–10:20~10 weight percent. A board fabricated by mainly mixing the crushed barley straw or wheat straw having a cold emitting function is used as a construction material, a material for furniture and a board which require the air cooling function. In this case, an adhesive used therein comprises barley powder paste or wheat powder paste, crushed ginkgo tree (leaves thereof) of 50~200 mesh, crushed paulownia tree (leaves thereof) of 50~200 mesh at a ratio of 60~80:20–10:20~10 weight percent.

A Fifth Process
A Process of Forming an Auxiliary Material

Cotton wool is sliced in a length of 5~50 mm, or peel of hemp or abaca is sliced in a length of 5~50 mm to form an auxiliary material.

A Sixth Process
A Process of Forming a Flexible Material

The crushed vegetational material of the first process and the clay of the second process are mixed at a ratio of 50~80:50~20 weight percent and then homogenized to form a composition of a flexible board.

A Seventh Process
a Process of Forming a Hard Material

The crushed vegetational material of the first process, the clay of the second process, the seaweed adhesive of the third process and the functional adhesive of the forth process are mixed at a ratio of 40~65:40~10:10~20:10~5 weight percent and then homogenized to form a composition of a hard board.

A Eighth Process
A Process of Forming a Board

The composition of the flexible board of the sixth process and the composition of the hard board of the seventh process are received in a hopper like in a process of fabricating a typical gypsum board so as to pass between a pair of rollers. Paper or woven fabrics wound in a roll state is disposed at an upper and lower sides of a passage to which the mixed composition is withdrawn in a proper thickness. The mixed composition is passed between rollers heated at a temperature of 100~300° C. together with the paper or woven fabrics disposed at both sides of the mixed composition, and then cut in a desired length. Alternatively, each of the compositions of the flexible board and the hard board is filled on upper and lower surfaces of a frame, and the paper or woven fabrics is disposed at the upper and lower surfaces of the frame, and then the compositions are pressed along with the paper or woven fabrics at a desired temperature by the rollers or a press so as to fabricate a board.

A Ninth Process
A Process of Drying and Completing a Product

The board of the eighth process is dried by hot air or by passing through a dry furnace so as to form a product.

Second Embodiment

The crushed vegetational material, the clay, the seaweed adhesive or the functional adhesive and the auxiliary material are mixed at a ratio of 40~65:40~10:10~20:10~5 weight percent to form a mixed composition. The mixed composition is received in a hopper to be withdrawn between a pair of rollers in a desired thickness. A color steel plate or veneer, a wood thin film, a wood sawn board, a plywood, etc. are positioned at upper and lower surfaces or one surface of the mixed composition, and then the mixed composition is press-molded along with the color steel plate or veneer, the wood thin film, the wood sawn board, the plywood, etc., by the roller or the press. The pressed board is dried for a desired time and then cut in a desired length to complete various board materials using the crushed vegetational material and the clay.

Third Embodiment

The crushed vegetational material, the clay, the seaweed adhesive or the functional adhesive and the auxiliary material are mixed at a ratio of 40~65:40~10:10~20:10~5 weight percent to form a mixed composition. The mixed composition is received in a hopper to be withdrawn in a desired thickness. If necessary, a frame is disposed at the withdrawn mixed composition so as to be buried in the mixed composition by a press, etc.

Herein, the frame means a reinforcing material used in the production of the board, such as a piece of bamboo, a piece of wood, a wire or a piece of aluminum, etc. The frame is buried in the material (the crushed vegetational material, the clay, the seaweed adhesive or the functional adhesive and the auxiliary material) to increase durability of the board product and prevent twisting of the board product according to an application of the board.

Sequentially, after paper or woven fabrics is disposed are positioned at upper and lower surfaces or one surface of the mixed composition, the mixed composition is passed between a pair of rollers along with the paper or woven fabrics and cut in a desired length and then dried properly. A composition forming by the crushed vegetational material, the clay, the seaweed adhesive or the functional adhesive and the auxiliary material is coated in a desired thickness on both or one surface of the dried board, and after a color steel plate is disposed at both or one surface of the board, the mixed composition is press-molded by the roller or the press, etc. and dried to complete a color steel plate board using the crushed vegetational material and the clay.

As described above, if the rice straw generating warmth is used as a source material, the thermal insulation function is increased. In the case of the barley straw and the wheat straw generating cold, the air cooling function is increased. In the case of the ginkgo tree, the mothproofing function is increased. Particularly, the green leaves of the ginkgo tree absorbs (blocks) radioactivity (radium). And in the case of the paulownia tree, since it provides the moisture proofing function, it is possible to fabricate a functional board according to the source material.

Further, in the case of the clay as a porous material, it has a humidity controlling function, a thermal insulation function and a fire proofing function. In the case of the seaweed, since it has a desired viscosity extracted from a natural substance, it has a good affinity for the crushed vegetational material and the clay and thus has an excellent adhesive property. It is also innoxious to the human body. A functional paste containing the rice paste has the thermal insulation function. A functional paste containing the barley and wheat paste has the air cooling function. These functional pastes are also helpful for health and nature. In the case of the cotton wool, hemp or abaca, it functions to increase toughness and strength of the board.

As described above, in the case of the board made from the flexible material according to the present invention, it has a poor strength but a good workability to be facilely used as a ceiling material or an interior material. In the case of the hard material, since it has a good strength and stiffness, it can be used as a material for a door or furniture.

Further, since the board of the present invention is made of natural substances, it is facilely resolved in the soil and also served as compost when being scrapped.

In addition, according to the present invention, if the frame having a desired size is used, when the board is made from the flexible material or the hard material, the board is harder and stiffer.

Moreover, the board of the present invention can be used as a decorative material having various shapes, such as a polygonal bar and a circular rafter, a substitute material for furniture having various shapes and patterns, and a construction material such as a cylindrical pole and a polygonal pole, using the fabricating method thereof.

As described above, the board according to the present invention has a fire proofing function without the contamination of environment. It is also used as a construction interior/exterior material or a material for furniture. Further, since the board is made from an environment-friendly material obtained from nature, such as the crushed vegetational material, the seaweed and the clay, it will function as compost when being scrapped. Furthermore, since the board is made of fire-retardant materials, it is possible to reduce damage when a fire is occurred. Furthermore, the material of the board functions to maintain indoor air to be clean.

While the present invention has been described in detail, it should be understood that various changes, substitutions and alterations could be made hereto without departing from the spirit and scope of the invention as defined by the appended claims.

What is claimed is:

1. A method of fabricating a board using vegetational material and clay, comprising steps of:
    forming a composition fabricated by mixing vegetational material, clay, a seaweed adhesive and a functional adhesive, and an auxiliary material at a ratio of 40~65:40~10:10~20:10~5 weight percent, and then throwing the composition into a hopper;
    withdrawing the composition received in the hopper so as to be passed between a pair of rollers and then molding the composition in a desired size;
    passing the composition between the rollers heated at a temperature of 100~300° C. and disposing paper or woven fabrics at upper and lower surface of the composition and then pressing the composition along with the paper or woven fabrics; and
    cutting the pressed composition in a desired size.

2. The method of claim 1, wherein a frame is buried in the composition.

3. A method of fabricating a board using vegetational material and clay, comprising steps of:
    disposing paper or woven fabrics having a warmth emitting function, such as cotton or silk having a warmth emitting function;
    forming a composition fabricated by mixing vegetational material made of rice straw generating warmth, clay, a seaweed adhesive and a functional adhesive, and an auxiliary material at a ratio of 40~65:40~10:10~20:10~5 weight percent, and then coating the composition on the paper or woven fabrics, the vegetational material being mainly formed by rice straw;
    disposing a frame on an upper surface of the paper or the woven fabrics on which the composition is coated;
    filling the composition fabricated by mixing the vegetational material, clay, a seaweed adhesive and a functional adhesive, and an auxiliary material at a ratio of 40~65:40~10:10~20:10~5 weight percent in the frame;
    disposing the paper or the woven fabrics thereon, if the composition is filled in the frame in a desired thickness;
    forming a composition fabricated by mixing vegetational material made of barley and wheat straws, clay, a seaweed adhesive and a functional adhesive, and an auxiliary material at a ratio of 40~65:40~10:10~20:10~5 weight percent, and then coating the composition on the paper or woven fabrics in a desired thickness, the vegetational material being mainly formed by barley straw or wheat straw;
    disposing the frame on an upper surface of the paper or the woven fabrics;
    filling the composition fabricated by mixing vegetational material, clay, a seaweed adhesive and a functional adhesive, and an auxiliary material at a ratio of 40~65:40~10:10~20:10~5 weight percent in the frame;
    disposed the paper or the woven fabrics thereon, such as grass cloth or hemp cloth having an air cooling function, if the composition is filled in the frame in a desired thickness; and
    pressing the composition by a press and then drying.

4. A method of fabricating a board using vegetational material and clay, comprising steps of:
    disposing paper or woven fabrics;
    forming a composition fabricated by mixing vegetational material, clay, a seaweed adhesive and a functional adhesive, and an auxiliary material at a ratio of 40~65:40~10:10~20:10~5 weight percent, and then coating the composition on the paper or woven fabrics;
    disposing a frame on an upper surface of the paper or the woven fabrics on which the composition is coated;
    filling the composition fabricated by mixing vegetational material, clay, a seaweed adhesive and a functional adhesive, and an auxiliary material at a ratio of 40~65:40~10:10~20:10~5 weight percent in the frame;
    disposing the paper or the woven fabrics thereon, if the composition is filled in the frame in a desired thickness;
    repeatedly performing the above steps to form a plurality of layers;

pressing the composition by a press and then drying.

5. A method of fabricating a board using vegetational material and clay, comprising steps of:

forming a composition fabricated by mixing vegetational material, clay, a seaweed adhesive and a functional adhesive, and an auxiliary material at a ratio of 40~65:40~10:10~20:10~5 weight percent, and then throwing the composition in a hopper;

withdrawing the composition received in the hopper in a desired length so as to be passed between a pair of rollers, and disposing a color steel plate, a veneer, a wood thin film, a wood sawn board, a plywood at both upper and lower surfaces or one surface of the composition, and then press-molding the composition by the roller or a press; and drying the molded composition for a desired time and then in a desired length.

6. A method of fabricating a board using vegetational material and clay, comprising steps of:

forming a composition fabricated by mixing vegetational material, clay, a seaweed adhesive and a functional adhesive, and an auxiliary material at a ratio of 40~65:40~10:10~20:10~5 weight percent, and then throwing the composition in a hopper;

withdrawing the composition received in the hopper so as to be passed between a pair of rollers along with paper or woven fabrics disposed at both upper and lower surfaces or one surface of the composition, and then molding and drying the composition in a desired length; and coating the vegetational material, the clay, the seaweed adhesive and the functional adhesive time on both surfaces or one surface of the dried composition, and then disposing a color steel plate, a veneer, a wood thin film, a wood sawn board, a plywood at both upper and lower surfaces or one surface of the composition, and then press-molding the composition by the roller or a press.

7. The method of claim 5, further comprising a step of providing a frame on the paper or woven fabrics after withdrawing the composition received in the hopper.

8. The method of claim 6, further comprising a step of providing a frame on the paper or woven fabrics after withdrawing the composition received in the hopper.

* * * * *